United States Patent
Cepek

(10) Patent No.: US 10,826,352 B2
(45) Date of Patent: Nov. 3, 2020

(54) ELECTRIC MACHINE WITH VARIABLE COOLING SYSTEM

(71) Applicant: Siemens Aktiengesellschaft, Munich (DE)

(72) Inventor: Thomas Cepek, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 123 days.

(21) Appl. No.: 15/764,376

(22) PCT Filed: Sep. 8, 2016

(86) PCT No.: PCT/EP2016/071148
§ 371 (c)(1),
(2) Date: Mar. 29, 2018

(87) PCT Pub. No.: WO2017/055047
PCT Pub. Date: Apr. 6, 2017

(65) Prior Publication Data
US 2018/0309345 A1   Oct. 25, 2018

(30) Foreign Application Priority Data
Sep. 30, 2015  (EP) .................... 15187620

(51) Int. Cl.
*H02K 9/18* (2006.01)
*H02K 9/10* (2006.01)

(52) U.S. Cl.
CPC ............ *H02K 9/18* (2013.01); *H02K 9/10* (2013.01); *H02K 2213/09* (2013.01); *H02K 2213/12* (2013.01)

(58) Field of Classification Search
CPC ........ H02K 9/18; H02K 9/10; H02K 2213/12; H02K 2213/09
(Continued)

(56) References Cited

U.S. PATENT DOCUMENTS 2,470,488 A * 5/1949 Honerkamp ............ F24F 13/06
454/308
4,556,809 A * 12/1985 Beisse .................... H02K 99/00
310/114

(Continued)

FOREIGN PATENT DOCUMENTS

| CN | 1497821 | 5/2004 |
| CN | 1727727 | 2/2006 |

(Continued)

OTHER PUBLICATIONS

Zimmermann et al (EP 0639883 A1), English translation in EPO, printed on Mar. 11, 2020 (Year: 2020).*

(Continued)

*Primary Examiner* — John K Kim
(74) *Attorney, Agent, or Firm* — Cozen O'Connor

(57) ABSTRACT

An electric machine includes a housing for holding a cooling device, wherein the housing is provided for respectively holding a cooling device of different size, where the electric machine also includes an air cooling section that includes a first air guidance element for guiding the cooling air and includes a first positioning element for positioning the first air guidance element at a multiplicity of positions, where brackets are provided for positioning elements and the brackets can be oriented in an axial direction of the electric machine such that housings of similar size can be used for electric machines.

8 Claims, 5 Drawing Sheets

(58) Field of Classification Search
USPC .................................................. 310/52, 53, 58
See application file for complete search history.

(56) References Cited

U.S. PATENT DOCUMENTS

| | | | | |
|---|---|---|---|---|
| 5,218,998 A * | 6/1993 | Bakken | ................... | F24F 13/12 |
| | | | | 137/625.28 |
| 5,602,435 A * | 2/1997 | Iseli | ................... | H02K 9/10 |
| | | | | 310/55 |
| 2003/0020339 A1 | 1/2003 | Ide et al. | | |
| 2004/0066099 A1* | 4/2004 | Weeber | ................... | H02K 9/12 |
| | | | | 310/58 |
| 2004/0119346 A1 | 6/2004 | Schleussinger et al. | | |
| 2006/0025262 A1* | 2/2006 | Kleman | ................... | B60K 6/365 |
| | | | | 475/5 |
| 2009/0273246 A1 | 11/2009 | Weiss | | |
| 2013/0221774 A1 | 8/2013 | Agostini et al. | | |
| 2018/0309345 A1* | 10/2018 | Cepek | ................... | H02K 9/10 |

FOREIGN PATENT DOCUMENTS

| | | |
|---|---|---|
| EP | 0639883 | 2/1995 |
| EP | 1220424 | 7/2002 |
| EP | 1361645 | 11/2003 |
| EP | 1408601 | 4/2004 |
| EP | 2800251 | 11/2014 |
| JP | S54158207 | 12/1979 |
| JP | 2013-034332 | 2/2013 |
| RU | 2408964 C2 | 1/2011 |
| SU | 1356124 | 11/1987 |
| WO | WO2012045358 | 4/2012 |

OTHER PUBLICATIONS

Office Action dated Mar. 22, 2019 issued in Chinese Patent Application No. 201680050347.4.

PCT International Search Report and Written Opinion of International Searching Authority dated Mar. 1, 2017 corresponding to PCT International Application No. PCT/EP2016/071148 filed Aug. 9, 2016.

* cited by examiner

ELECTRIC MACHINE WITH VARIABLE COOLING SYSTEM

CROSS-REFERENCE TO RELATED APPLICATIONS

This is a U.S. national stage of application No. PCT/EP2016/071148 filed Sep. 8, 2016. Priority is claimed on EP Application No. 15187620 filed Sep. 30, 2015, the content of which is incorporated herein by reference in its entirety.

BACKGROUND OF THE INVENTION

1. Field of the Invention

The invention relates to an electric machine with a variable cooling system.

2. Detailed Description of the Related Art

In order to conduct dissipation power away from electric machines, they can be equipped with different cooling variants. One possibility is the use of air-water coolers as a cooling device. In order to keep the costs of the air-water coolers low for machines with large dissipation power levels, they are optimized for the dissipation power and the available water quality and/or water temperature. This has the effect that the coolers each have specific external dimensions (dependent on the parameters and the types from different manufacturers), which must be taken into account in the design of a machine housing, i.e., a housing for the electric machine. The electric machine is, for example, a synchronous machine or an asynchronous machine that is operable as a motor and/or a generator. If, during a project or manufacturing of the electric machine, a design parameter should change, then the cooling geometry and/or the design of the cooling device, i.e., of the air-water cooler possibly also change. Accordingly, the housing also has to be changed and/or adapted. Changes to the housing of the electric machine in which the cooling device is integrated can also be necessary if the cooling power and/or the cooling parameters remain the same, but another manufacturer of the cooling device is selected.

EP 0 639 883 A1 discloses a gas-cooled electric machine in which the effective flow cross-section of the connection from the outer heating gas chambers to the cooler is provided with adjustable throttle members. With this, the distribution of the different cooling air streams within the machine can be influenced without intervention in the machine itself, such that a levelling out of the temperature in the machine longitudinal direction is achieved.

EP 1 361 645 A1 discloses an axial fan-cooled turbo generator with an adjustable pre-swirl. The gas-cooled, rotating electric machine, particularly a turbo generator, has a rotatably mounted rotor and a stator surrounding the rotor concentrically, which are accommodated in a housing, where for cooling the machine at least one axial fan, which draws in a gaseous cooling medium from a coaxial suction chamber and forces it into a pressure chamber, is arranged on the rotor at the end side.

In such a machine, an improvement of the efficiency is achieved in that in the region of the suction chamber, on one side, in order to change the characteristic of the axial fan, an adjustable guiding device is provided, by which the coolant flowing into the suction chamber is optionally subjected to a co-rotating or a counter-rotating swirl, relative to the rotation direction of the axial fan, or a mixture of both swirl types.

EP 1 220 424 B1 discloses a rotating electric machine with a plurality of ventilation channels that are formed between a stator frame and a stator iron core and continuously extend in the peripheral direction. A plurality of ventilation conduits that are formed in the stator iron core continuously extend in the radial direction.

SUMMARY OF THE INVENTION

It is an object of the invention to provide an electric machine that results in an improved variability for the cooling system.

This and other objects and advantages are achieved in accordance with the invention by an electric machine, by electric machines and by a method for manufacturing the electric machines, where within an electric machine with a housing for accommodating a cooling device, the housing is provided for respective accommodation of a cooling device of different sizes. The size particularly relates to the dimension of the cooling device (e.g., height, width, length). The electric machine has an air cooling system with a first air guiding element for guiding the cooling air, where the first air guiding element is positionable at a plurality of positions, where the position depends on the size of the cooling device. The first air guiding element separates a first cooling airflow portion from a second cooling airflow portion, where the first cooling airflow portion is opposite to the second cooling airflow portion. Consequently, during operation of the electric machine, the cooling air in the first cooling airflow portion has a first direction and the cooling air in the second cooling airflow portion has a second direction, where the first direction is opposite to the second direction. The cooling air in the first cooling airflow portion is, for example, cooling air that is still provided for cooling and the cooling air in the second cooling airflow portion is cooling air that has already cooled and thus is warmed. For example, a stator and/or a rotor of the electric machine has been cooled.

In an electric machine with an air cooling system, therefore, a first air guiding element is provided for guiding the cooling air. A first positioning element is provided for positioning the first air guiding element to a plurality of positions. The cooling air is guidable via the air guiding element. With the positioning element, the position of the air guiding element can be fixed at least during the manufacturing of the electric machine or also thereafter. The positioning can be changed dependent upon the space and/or volume requirements of parts of the electric machine in its housing. If the electric machine has a cooling device, such as an air-water cooler as a heat exchanger, then cooling devices of different sizes can be installed in the housing of the electric machine and, dependent upon their space requirements, the air guiding elements can be positioned, so that a desired course of the cooling air is set and, for example, no by-passes arise that could reduce the cooling effectiveness. The air guiding element is, for example, an air guiding sheet or an element made of a plastics material.

With one or more variably positionable air guiding elements, it is no longer necessary in every case to design a special housing adapted to an air-water cooler. Herein, for example, the geometry of the opening for cooler mounting, i.e., for mounting the cooling device and a drip prevention can always be specially matched.

Through the variable positioning of one or more air guiding elements, it is possible to use cooling devices, such as an air-water cooler, of different geometries within predefined limits of a housing of an electric machine without the housing design having to be adapted. For this purpose, the limits of the cooler geometry have, for example, already been matched to the electric machine in advance.

In one embodiment of the electric machine, the space for the cooling device, that is in particular, for the air-water cooler is configured in accordance with the maximum possible cooler dimensions. Consequently, a maximum-sized cooler and also smaller coolers can be accommodated in the space.

With a flexibly adaptable space, it is possible, for example, to realize a change of the design parameters of, for example, the air-water cooler or a change of the cooler supplier in a project progress for the construction of the electric machine without the configuration of the housing of the electric machine having to be adapted therefor. Only the cooler cover must perhaps be adapted in this case. Thus, no expensive and/or time-consuming changes to manufacturing drawings are necessary. Also, either the conversion of the housing or even a re-configuration of the housing, provided this was already in production, is avoidable. Aside from the costs, the extension of the production process as far as postponements of the delivery deadline is no longer a problem.

In another embodiment, the electric machine has a first holder for the positioning element. The holder is, for example, a rail in which a positioning element can be hung. The holder is, for example, a row of holes into which the positioning element can be inserted and/or screwed. Thus, the position of the positioning element which has, for example, a type of hook, can be freely selected dependent upon the size of the cooler, i.e., the cooling device.

In a further embodiment of the electric machine, accommodation of the cooling device and thus also of the cooler weight and the air guidance is realized with adjustable "cooler slotted guides". The cooler slotted guide is displaced and then possibly fixed in accordance with the cooler geometry. Herein, the cooler slotted guide has, in particular, a positioning element.

If the electric machine has a drip prevention, also known as a drip catcher, then the drip prevention can be dimensioned uniformly for the largest possible cooler.

If the electric machine has a closing cover on the housing for installation and/or connection of the cooling device, then this can be adapted dependent upon the cooling device used.

In another embodiment of the electric machine, the first holder is oriented in an axial direction of the electric machine. A positioning element or a plurality of positioning elements can thus be differently positioned axially. The axial direction is determined by the axis of the shaft of the electric machine.

In an embodiment of the electric machine, the first air guiding element has a flexible end piece. If the air guiding element is displaced, or placed at different positions, together with the positioning element, then a good air seal can be achieved through the flexible end piece. The flexibility is achieved, for example, by the bending capability of a sheet and/or with flexible materials, such as silicone or rubber.

In another embodiment of the electric machine, the first air guiding element forms a cooling circulation. The cooling circulation is, for example, a cross-ventilation. The air guiding element separates, for example, heated air from cooled air. Thus, in one embodiment of the electric machine, the first air guiding element separates a first cooling airflow portion from a second cooling airflow portion. Thus, in one embodiment of the electric machine, the first cooling airflow portion is opposite to the second cooling airflow portion.

In a further embodiment of the electric machine, the first cooling airflow portion is heated and the second cooling airflow portion is cooled. Therebetween, therefore, the cooling air has flowed through the cooling device.

In another embodiment of the electric machine, the first air guiding element is arranged on an operating side of the electric machine and a second air guiding element is arranged on a driving side of the electric machine. Thus, a cross-ventilation can be achieved in a simple manner.

In an embodiment of the electric machine, the first air guiding element or a plurality of air guiding elements are arranged in a radial position that is defined by the spacing between a cooling device and the stator of the electric machine. The air guiding element or air guiding elements are thus arranged completely or partially between the stator and the cooling device if the spacing thereof from the axis of the shaft of the electric machine is considered.

In an embodiment of electric machines, a first electric machine with a first housing and a second electric machine with a second housing is provided, the first housing and the second housing having a similar size, where within the first housing and within the second housing, an air guiding element of similar function is arranged at different positions. The electric machines involve, for example, a model range. The electric machines have, in particular, different power levels. Dependent upon the power level, the cooling can also be different. If the first electric machine has a higher power output (in particular rated power and/or maximum power) than the second electric machine, then for the first electric machine, a first cooling device can be provided, with a higher cooling output than for the second electric machine with the second cooling device. The first cooling device therefore has a higher cooling power than the second cooling device. The housing of both electric machines can have the same external dimensions.

In another embodiment of the electric machines, the orientation and/or position of the holder, in particular a support rail, in the first electric machine can be identical to the second electric machine. The holder is, in particular, firmly connected to the housing of the electric machine. This is achieved, for example, via a weld joint, or through a rivet joint.

In one embodiment of the electric machine, the air guidance to the cooling device within the housing of the first and/or second electric machine is variable. Herein, in the first electric machine, a different drip prevention from that in the second electric machine can be used. However, it is also possible to provide the same drip prevention in both electric machines in order, for example, to increase the number of identical parts. An identical drip prevention can be matched to a maximum requirement for the drip prevention. An opening in the housing of the electric machine for mounting the cooling device can also be configured maximally, so that with the same housing, different cooling devices can be installed for different electric machines.

In a further embodiment of the electric machines, i.e., of the at least two electric machines, the different positions of the cooling devices(i.e., the first cooling device of the first electric machine and the second cooling device of the second electric machine) are adapted to the different sizes of the cooling devices.

It is also an object to provide a method for producing electric machines, where one housing type is used for electric machines of different power outputs, and where air guiding elements are positioned at different positions within the housing dependent upon the power output of the electric machine. The housing type for at least two electric machines of different power output has, in particular at least the same outer dimensions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described by way of example based upon the various drawings, in which.

DETAILED DESCRIPTION OF THE EXEMPLARY EMBODIMENTS

Figure 1:
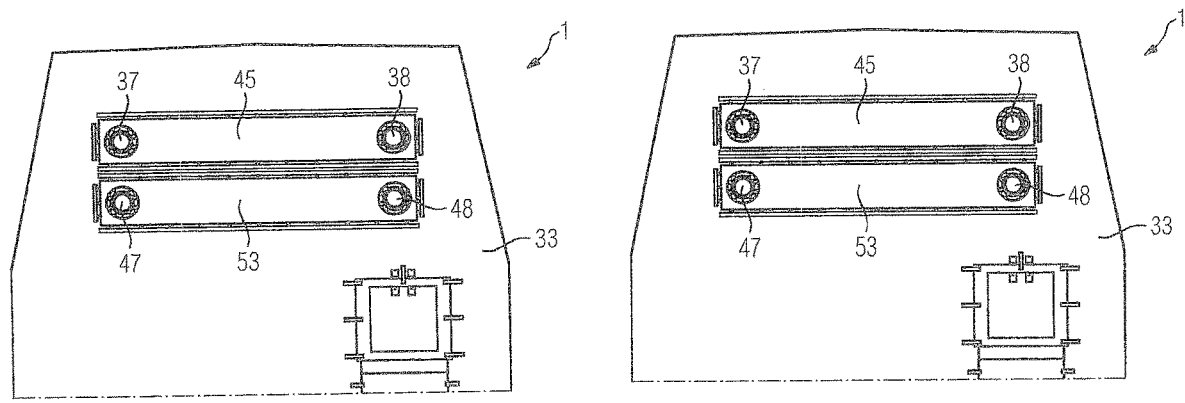
FIG. 1 is a first external view of a plurality of electric machines in accordance with the invention.

The representation of FIG. 1 shows a portion of a first external view of an electric machine 1. Further embodiments of electric machines are also shown in the figures described below, where similar elements are provided with the same reference signs. The electric machine 1 shown in FIG. 1 has a housing 33 of the electric machine in which four connections for cooling fluid 37, 38, 47 and 48 are provided. The connections 37 and 38 are provided for a first cooling device 45 and the connections 47 and 48 are provided for a second cooling device 53. The cooling devices 45 and 53 are, for example, air-water coolers (heat exchangers).

Figure 2:
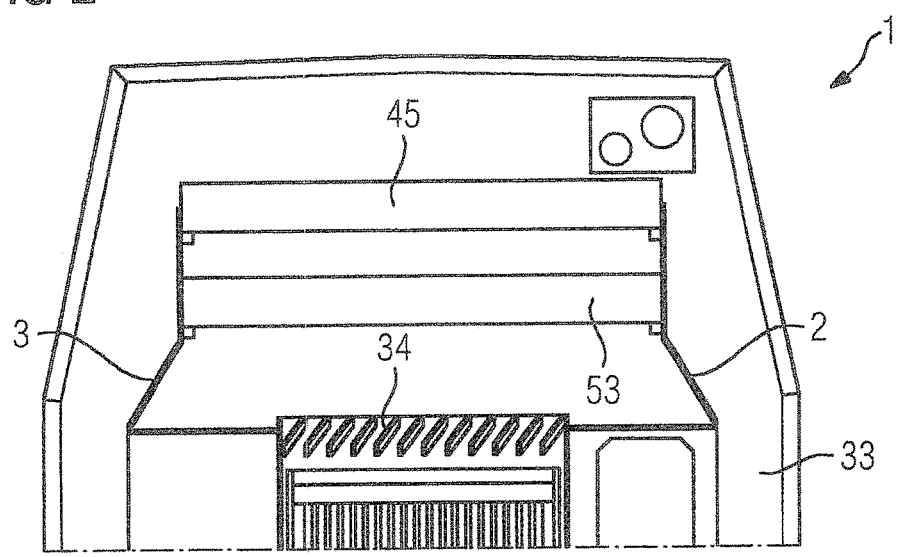
FIG. 2 is a first internal view of an electric machine in accordance with the invention.

FIG. 2 shows a first internal view of the electric machine 1 with two cooling devices 45 and 53. The cooling air can be fed via a first air guiding element 2 and a second air guiding element 3. The first and second air guiding elements 2 and 3 can also assume the function of a support structure for supporting the first cooling device 45 and the second cooling device 53. So that a stator of the electric machine will not be damaged, for example, in the long term by condensed water, a drip catcher 34 is provided.

Figure 3:
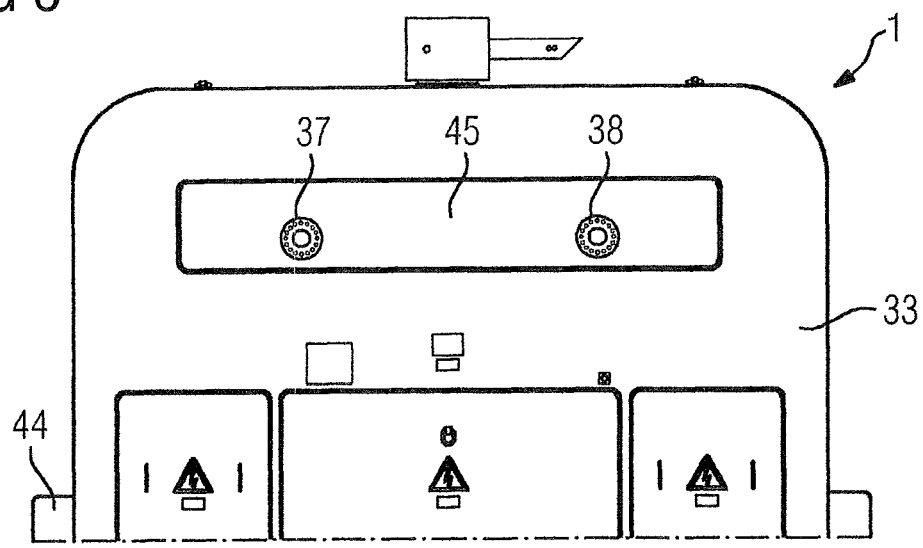
FIG. 3 is a second external view of an electric machine in accordance with the invention.

FIG. 3 shows a portion of a second external view of a further electric machine 1, which has only one cooling device 53 as compared with the electric machine of FIG. 1. Here, the connections 37 and 38 are provided for connection to the cooling fluid. In FIG. 3, a shaft 44 of the electric machine 1 is also indicated.

Figure 4:
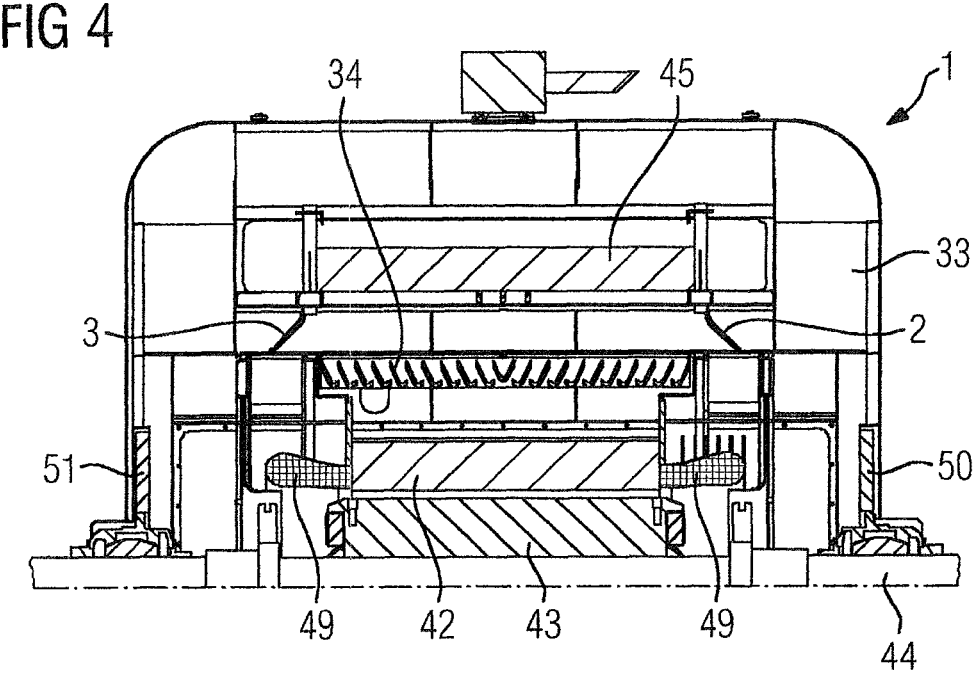
FIG. 4 is a second internal view of an electric machine in accordance with the invention.

FIG. 4 shows a second internal view of the electric machine 1 of FIG. 3 with the sole cooling device 53. Here, the cooling air also can be fed via the first air guiding element 2 and the second air guiding element 3. The first and second air guiding elements 2 and 3 can also assume the function of a support structure for supporting the cooling device 53. In order that the stator 42 of the electric machine, which also has a rotor 43, is not made wet, the drip catcher 34 is provided. The first and second air guiding elements 2 and 3 can advantageously be flexibly fastened at different positions. Considering the axial position of the first and second air guiding elements 2 and 3, these are arranged axially in the region of the two winding overhangs 49. The electric machine 1 also has end shields 50 and 51.

Figure 5:
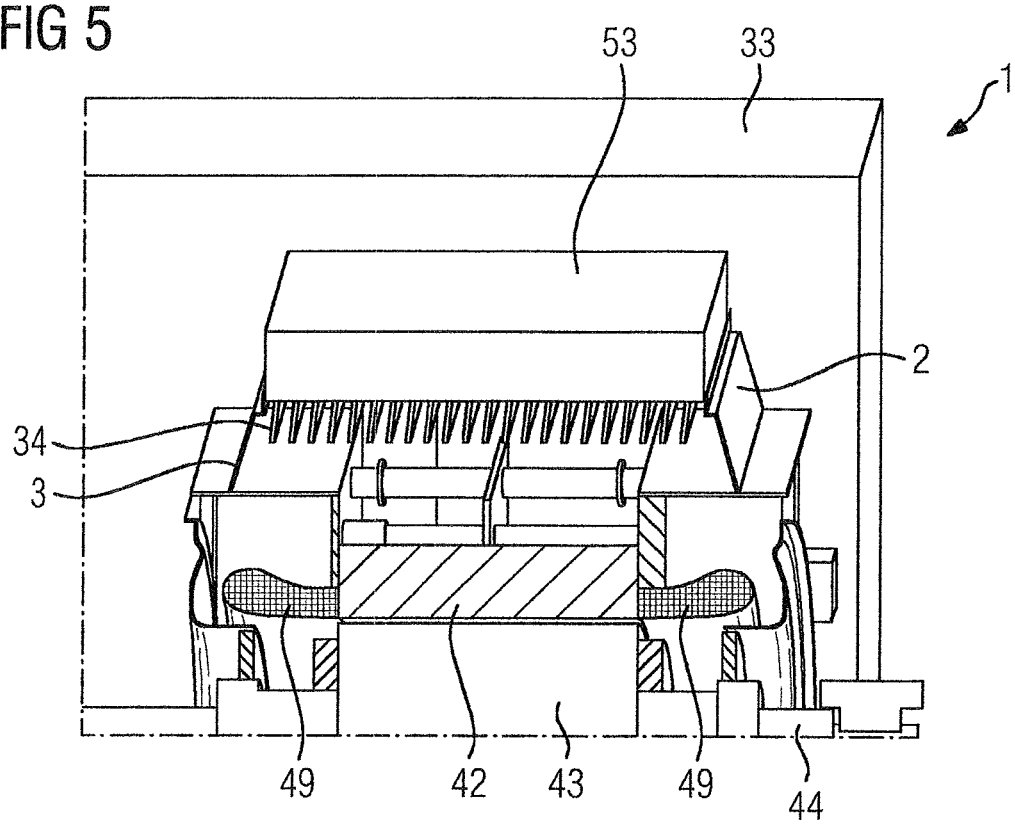
FIG. 5 is a third internal view of an electric machine in accordance with the invention.

FIG. 5 shows a third interior view of an electric machine 1 in which the first and second air guiding elements 2 and 3 are represented in a perspective view.

Figure 6:
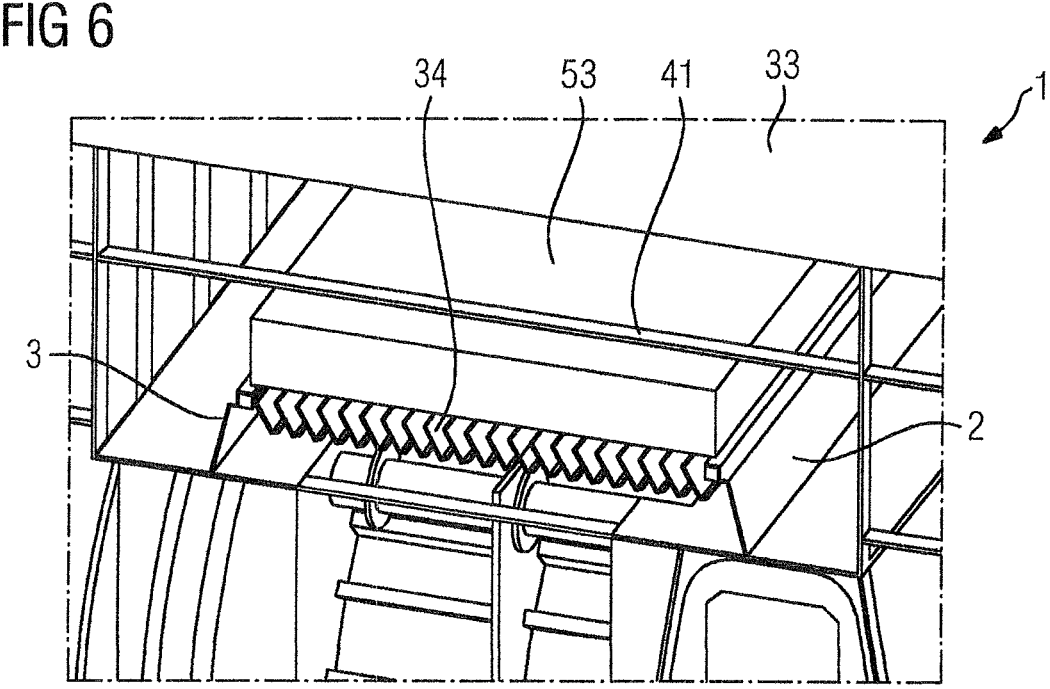
FIG. 6 is a fourth internal view of an electric machine in accordance with the invention.

FIG. 6 shows a fourth interior view of an electric machine 1 in which a housing frame 41 of the housing 33 is shown in detail. The drip catcher 34 is also shown in a greater level of detail. It is herein apparent that the drip catcher 34 has a large number of channels that are formed by a large number of L-structures. The L-structures are, for example, metal sheets that are bent such that they have an L-shaped cross-section.

Figure 7:
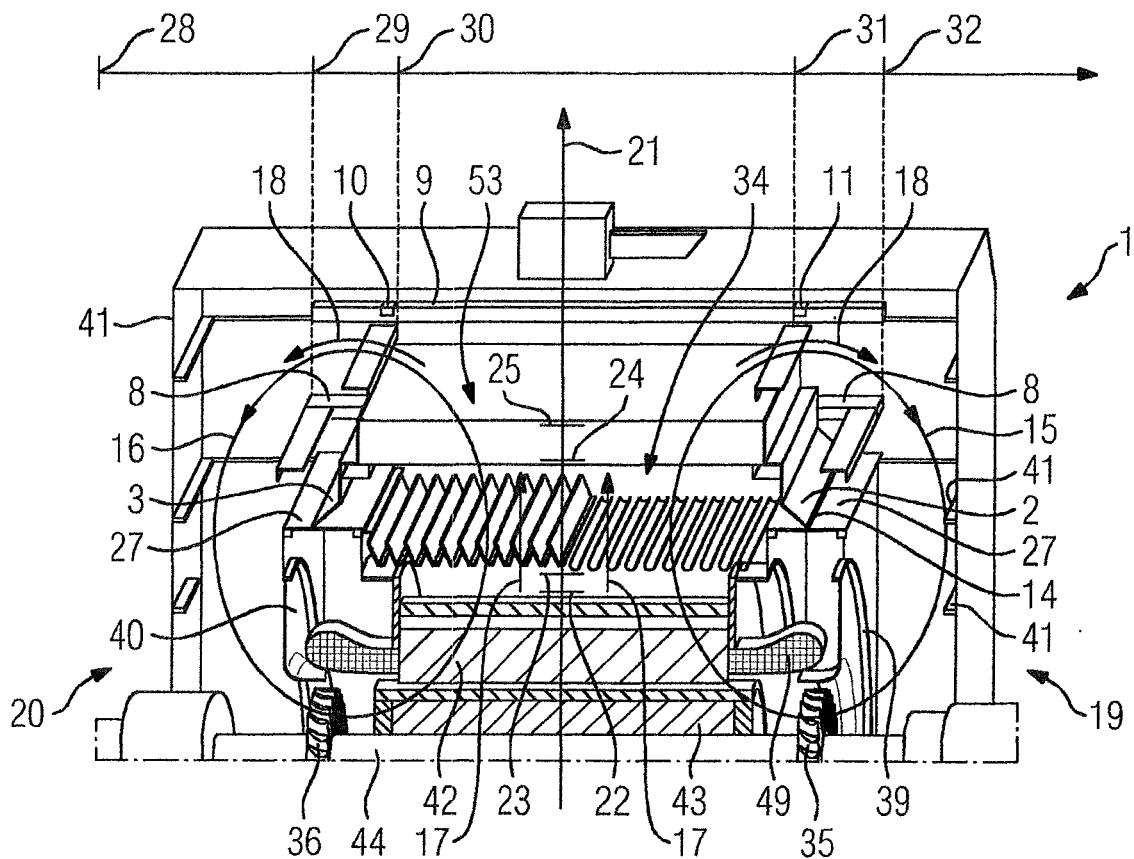
FIG. 7 is a fifth internal view of an electric machine in accordance with the invention.

FIG. 7 shows a fifth interior view of an electric machine 1. Situated within the housing 33 with the housing frame 41 are the stator 42 and the rotor 43 of the electric machine. Arranged on the shaft 44 are fans 35 and 36 for generating a cooling airflow 15 and/or 16. A cross-ventilation with a first cooling airflow circuit 15 on a driving side 19 of the electric machine 1 and a second cooling airflow circuit 16 on an operating side 20 of the electric machine 1 are shown. Herein, the cooling air is guided along, in particular at the winding overhangs 49, in order to also cool these components. The fan 35 is arranged in a fan channel 39 which guides the cooling air axially as well as radially. For radial guidance, the fan channel 39 has a type of disk structure that is arranged perpendicularly to the shaft 44 and separates cooled cooling air from heated cooling air. The fan 36 is arranged in a fan channel 40 that guides the cooling air axially as well as radially. For radial guidance the fan channel 44 also has a type of disk structure that is arranged perpendicularly to the shaft 44 and separates cooled cooling air from heated cooling air.

The first cooling airflow circuit 15 and the second cooling airflow circuit 16 have a first cooling airflow portion 17 with heated cooling air and also have a second cooling airflow portion 18 with cooled cooling air. The heated cooling air is heated by the rotor 43 and/or the stator 42. The cooled cooling air is cooled by the cooling device 53 that is an air-water cooling device. A first positioning element 10 and a second positioning element 11 are provided for positioning the cooling device 53. The positioning elements 10 and 11 are arranged in a holder 9 and/or in a holder 8. The positioning elements 10 and 11 can be positioned and/or displaced along the holders 8 and 9. The supporting structure for the cooling device 53 is provided by the positioning elements 10 and 11, such that the cooling device can be positioned over the drip catcher. The size of the supporting structure is adapted to the size of the cooling device by the variable positioning of the positioning elements 10 and 11.

Figure 8:
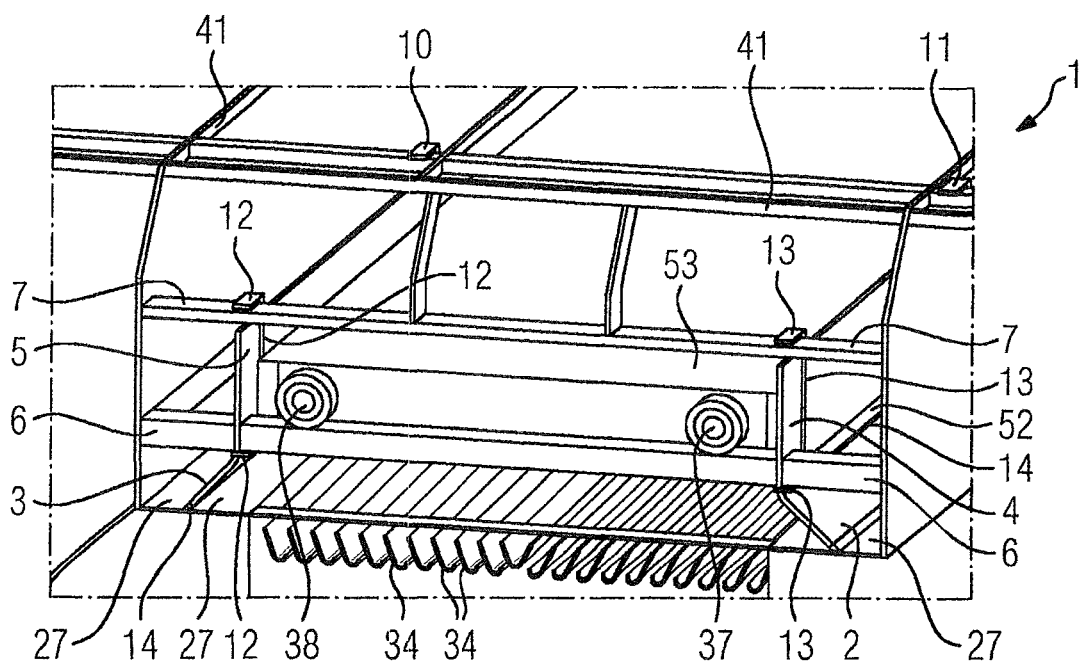
FIG. 8 is a sixth internal view of an electric machine in accordance with the invention.

FIG. 8 shows a first positioning element 10, a second positioning element 11, a third positioning element 12 and a fourth positioning element 13. Furthermore, in FIG. 8, a first holder 6, a second holder 7, a third holder 8 and a fourth holder 9 are shown. In FIG. 7, the third holder 8 and the fourth holder 9 are shown. The positioning elements 10 and 11 can be hung, for example, in the fourth holder 9 as in a rail. This applies accordingly for the third holder 8. FIG. 7 shows an axially oriented arrow with axial positions, an axial first position 28, an axial second position 29, an axial third position 30, an axial fourth position 31 and an axial fourth position 32. The first positioning element 10 that is configured, for example, hook shaped, can be positioned, for example, between the second axial position 29 and the third axial position 30. These positions are situated on the operating side 20 of the electric machine, which is also shown by the first axial position 28. The second positioning element 11, which is also configured, for example, hook shaped, can be positioned, for example, between the fourth axial position 31 and the fifth axial position 32. These positions are situated on the driving side 19 of the electric machine. The cooling device 53, the drip catcher 34 and the stator 42 are situated in particular radial positions to one another. In FIG. 7, a radial direction 21 is indicated by an arrow. From this, various radial positions are derivable, such as a first radial position 22, a second radial position 23, a third radial position 24 and a fourth radial position 25. The radial position of the cooling device 53 is determined via the third and fourth radial positions 24 and 25. The first and second radial positions 22 and 23 define the spacing between the stator 42 and the drip catcher 34. In order that no warm cooling air from the region between the stator 42 and the cooling device 53 is mixed with cooled cooling air, air guiding elements 2 and 3 are provided. The first air guiding element 2 separates warm cooling air before passing through the cooling device 53 from the cold cooling air cooled thereafter, on the driving side 19. The second air guiding element 3 separates warm cooling air before passing through the cooling device 53 from the cold cooling air cooled thereafter, on the driving side 20. The first air guiding element 2 is connected to the second positioning element 11 and can be displaced therewith. The second air guiding element 3 is connected to the first positioning element 10 and can be displaced therewith. Following the positioning, the positioning elements 10 and 11 can also be releasably connected to the housing, which is possible, for example, with a weld join. The first and second air guiding elements 2 and 3 each lie on a placement surface 27 and terminate therewith, so that the warm cooling air is separated from the cold cooling air. If the first and second air guiding elements 2 and 3 are displaced, their placement position on the respective positioning surface 27 also becomes displaced.

FIG. 8 shows a sixth interior view of an electric machine 1, which in comparison with that in FIG. 7, shows the region round the cooling device 53 more exactly. The cooling device 53 has connections 37 and 38 for cooling fluid. The cooling device 53 is held by a support frame 52 that is also formed at least partially by the positioning elements. In FIG. 8, not only the first and second positioning elements 10 and 11 are shown, but also the third and fourth positioning elements 12 and 13. The third positioning element 12 is guided by the first holder 6 and the second holder 7. The fourth positioning element 13 is also guided by the first holder 6 and the second holder 7. In FIG. 8, a first and second air guiding element 2 and 3 are shown which have on their end a flexible end piece 14 made, for example, of a silicone material, so that the region of warm cooling air is separated from the region of cold cooling air and a circulation can form for the cooling air. For this purpose, a third air guiding element 4 and a fourth air guiding element 5 are provided which separate cooling airflows from one another in a tangential direction in a type of continuation of the cooling device. With the illustrated positioning elements 10 to 13, a supporting structure that is flexibly changeable in its size can be formed for cooling devices of different sizes. The positioning elements 10 to 13 are held via holders 6 to 9 on the housing 33. The respectively allocated air guiding elements 2 to 5 are also displaceable with the positioning elements 10 to 13. The first and second air guiding elements 2 and 3 terminate on a placement surface 27 in order to be able to form a cooling air circulation.

Figure 9:
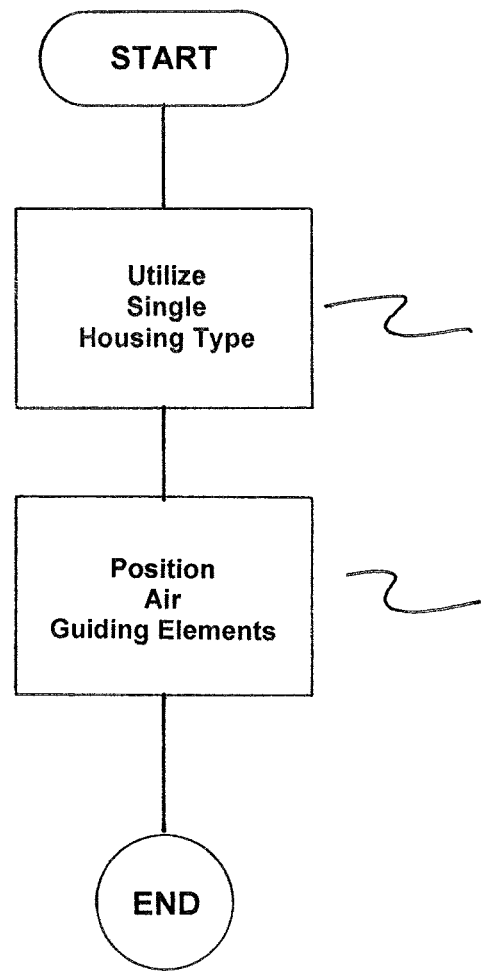
FIG. 9 is a flowchart of a method for producing electric machines in accordance with the invention.

FIG. 9 is a flowchart of a method for producing electric machines 1. The method comprises utilizing one housing type for electric machines of different power outputs, as indicated in step 910. Next, air guiding elements 2 are positioned at different positions within the housing dependent upon a power output of an electric machine, as indicated in step 920.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electric machine having a housing for respectively accommodating differently sized cooling devices, the electric machine comprising:
    an air cooling system having a first air guiding element comprising a flexible end piece for guiding the cooling air, the first air guiding element comprising the flexible end piece being positionable at one of a plurality of different positions, a position of the plurality of positions being dependent on a variable size of the cooling device, the first air guiding element comprising the flexible end piece separating a first cooling airflow portion from a second airflow portion, and the first cooling airflow portion being positioned opposite to the second cooling airflow portion; and
    a first positioning element for positioning the first air guiding element comprising the flexible end piece at one position of the plurality of positions with a first holder for the first positioning element.

2. The electric machine as claimed in claim 1, wherein the first holder is oriented in an axial direction of the electric machine.

3. The electric machine as claimed in claim 1, wherein the first air guiding element comprising the flexible end piece forms a cooling circulation.

4. The electric machine as claimed in claim 1, wherein the first cooling airflow portion is heated and the second cooling airflow portion is cooled.

5. The electric machine as claimed in claim 1, wherein the first air guiding element comprising the flexible end piece is arranged on an operating side of the electric machine and a second air guiding element is arranged on a drive side of the electric machine.

6. The electric machine as claimed in claim 1, wherein one of (i) the first air guiding element comprising the flexible end piece and (ii) a plurality of air guiding elements is arranged in a radial position which is defined by a spacing between the cooling device and a stator of the electric machine.

7. A plurality of electric machines having a first electric machine with a first housing and a second electric machine with a second housing, the first and second housings being similarly sized, wherein an air guiding element of similar function is arranged at different positions in the first housing and in the second housing, at least one of the first electric machine and the second electric machine comprising the electric machine as claimed in claim 1.

8. The plurality of electric machines as claimed in claim 7, wherein the different positions of the cooling device are adapted to different sizes.

\* \* \* \* \*